Feb. 21, 1956  J. H. KAUFFMAN ET AL  2,735,724
PNEUMATIC MATERIAL HANDLING APPARATUS
Filed May 6, 1952
7 Sheets-Sheet 1

Fig. 1

INVENTORS.
BY John H. Kauffman & Raymond H. Moore
Brown, Jackson, Boettcher & Dienner
ATTORNEYS.

Feb. 21, 1956 — J. H. KAUFFMAN ET AL — 2,735,724
PNEUMATIC MATERIAL HANDLING APPARATUS
Filed May 6, 1952 — 7 Sheets-Sheet 2

John H. Kauffman
and
Raymond H. Moore
INVENTORS.

BY
ATTORNEYS.

Feb. 21, 1956

J. H. KAUFFMAN ET AL

2,735,724

PNEUMATIC MATERIAL HANDLING APPARATUS

Filed May 6, 1952

John H. Kauffman
and
Raymond H. Moore
INVENTORS.

BY *Mason, Fenwick, Boettcher & Lawrence*

ATTORNEYS.

Feb. 21, 1956

J. H. KAUFFMAN ET AL

2,735,724

PNEUMATIC MATERIAL HANDLING APPARATUS

Filed May 6, 1952

INVENTOR.
BY John H. Kauffman and Raymond H. Moore

ATTORNEYS.

United States Patent Office 2,735,724
Patented Feb. 21, 1956

2,735,724

PNEUMATIC MATERIAL HANDLING APPARATUS

John H. Kauffman, Elkhart, Ind., and Raymond H. Moore, Birmingham, Mich., assignors, by mesne assignments, to Studebaker-Packard Corporation, a corporation of Michigan Application May 6, 1952, Serial No. 286,314

6 Claims. (Cl. 302—28)

The present invention relates to pneumatic material handling apparatus especially adpated for conveying granular, powered, pulverized and like materials, and, particularly, to valve means for controlling the flow of such materials.

Materials of the character referred to are customarily conveyed automatically by gravity feed. This requires the transportation of the material to elevated positions substantially directly above the stations or the like to which the materials are to be finally delivered. If any substantial lateral movement of the material is required, it is necessary to employ mechanical means, such as belt conveyors, reciprocating conveyors, conveyors or traveling hoppers, to effect the transfer. It will be appreciated, therefore, that a considerable amount of expensive equipment has been required to convey materials of the character described.

Various endeavors have been made to overcome the disadvantages of gravity feed systems. Among these is a pneumatic conveying system wherein the materials may be blown through conduits and the like by means of compressed air. While the pneumatic conveying system has overcome some of the disadvantages of gravity feed, the system has suffered certain disadvantages, the most prominent of which has been the lack of valve means for controlling flow through a main supply conduit and for selectively diverting materials from the supply conduit to any one of a plurality of delivery stations.

It is an object of the present invention to provide pneumatic conveying means for materials of the general character referred to, including novel valve means for controlling the flow of the material.

Another object of the present invention is the provision of pneumatic conveying means for materials of the general character referred to, including supply hoppers, conduits through which the material is conveyed by compressed air, and a plurality of novel valve means for diverting flow of material to any one of a plurality of delivery stations.

A further object of the invention is the provision of the novel valve means referred to hereinbefore, which are adapted to accommodate the flow of materials through the supply conduits or to divert the flow of material from said conduits.

In accordance with the present invention, we provide a valve means for pneumatic conveying systems of the character referred to, comprising a removable pipe or conduit section adapted to be disposed in and comprise a portion of the main supply conduit of the system, a movable baffle box adapted to be disposed in the main supply conduit in place of the removable conduit section to divert materials from the main supply conduit, and means for sealing either the conduit section or the baffle box in the supply conduit. The conduit section and baffle box are such that entry thereto may be accomplished at either side thereof so that bi-directional flow may take place in the supply conduit without changing the operating characteristics of the valve means.

By providing for bi-directional flow in the supply conduit, the present invention accommodates the utilization of a plurality of supply hoppers for the system, so that a constant source of supply is insured.

The predominant reason for the failure to devise satisfactory valve means for supply systems of the character referred to has been the inability to provide apparatus that would effectively resist the abrasive action of the materials to be conveyed. For the most part, the supply conduit and the conduit section, or corresponding portions of other valve means, are not subject to an extreme degree of abrasive wear, but the sealing means and means for diverting material flow are subject to extreme abrasive action. To overcome the difficulties of the abrasive action, the present invention provides improved sealing means and an improved baffle box. The baffle box may simply comprise a rectangular box having apertures in opposite walls thereof, adapted to be aligned with the ends of stationary portions of the supply condiut. In accordance with the present invention, a plurality of flexible baffles are loosely or movably mounted in the baffle box and extend across the axis of the apertures in the box. Materials entering at either side of the box under the conveyance of compressed air are deflected or diverted by the baffles. The baffles, being movable and flexible, resiliently absorb the shock of the incoming particles of material so that any tendency toward abrasive wear of the baffles is vastly reduced. The baffles are, however, preferably mounted loosely in the baffle box so as to be readily replaceable, since same eventually will be worn out. In addition to the foregoing, the loose mounting and resilient or flexible character of the baffles accommodate movement of the baffles toward the aperture in the box, opposite the aperture through which material is entering, so that the baffle adjacent the former aperture seals same to prevent flow of material through the baffle box.

Another object of the present invention is the provision of means for automatically effecting actuation of the valve means and sealing means therefor in proper sequence and at the appropriate time.

Further objects of the present invention include the provision of means for positively aligning the removable pipe or conduit section and the baffle box in the supply conduit, means for automatically effecting actuation of the sealing means in response to such positive alignment, and means for flexibly connecting the baffle box to the delivery station with which the valve means is associated.

In addition to the foregoing, it is an object of the present invention to provide valve means for pneumatic conveying systems wherein materials are to be fed from a primary system, or one of a plurality of primary systems, to any one of a plurality of secondary systems. In systems of this general character, the object is to transfer materials from a primary system to a secondary system, but without diverting the materials in the sense that the same are diverted by a baffle box as described hereinbefore and without venting air flow, so that the materials are conveyed through the secondary system by compressed air from the primary system.

According to the immediately foregoing object of the invention, we provide a valve means in the nature of a plurality of movable pipe sections adapted to be selectively aligned with any one of a plurality of primary system conduits and any one of a plurality of secondary system conduits to selectively establish communication between any one of the primary conduits and any one of the secondary conduits, as will appear more fully hereinafter.

The improved sealing means of the present invention is adapted for use with either type of valve means referred to hereinbefore and provides for effective sealing of the relatively movable members of the valve means so that the full advantages of the invention may be enjoyed.

Other objects and advantages of the present invention will become apparent in the following detailed description of preferred embodiments of the invention, wherein reference is made to the accompanying drawings, in which:

Figure 1 is a somewhat schematic representation of a complete system, including the system and baffle box valve means of the present invention, which may suitably comprise a molding sand conveying system for foundries or the like.

Figure 1:
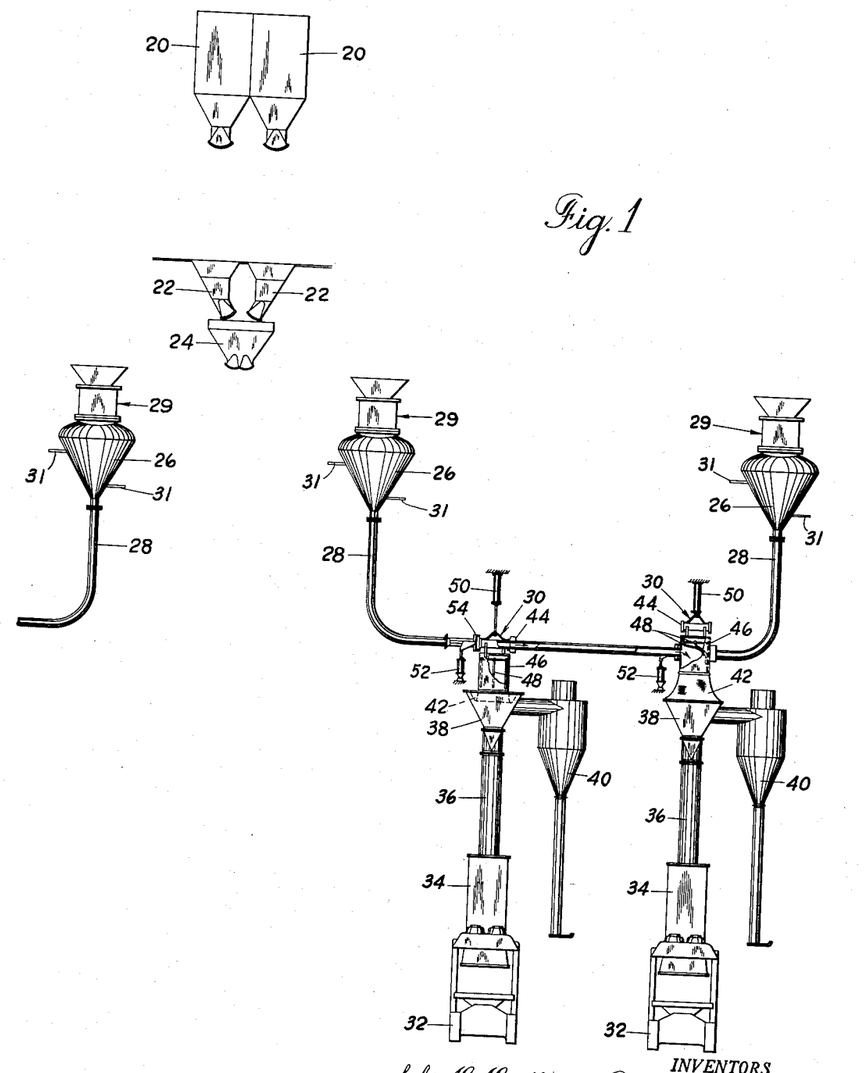

Referring now to the drawings and, particularly, to Figure 1, an exemplary installation of the conveying system and apparatus of the present invention is schematically shown, the apparatus and system being suitable for utilization in a foundry for conveying molding sand and the like from central hoppers or storage chambers to any one of a plurality of molding stations. As shown, a plurality of hoppers 20 are adapted for the reception of raw material and constitute the source of supply for the conveying system. The hoppers 20 are each adapted for the reception of materials, such as sand and the like, and are adapted to deliver materials to a plurality of hoppers 22, which are primarily rough measuring hoppers. The hoppers 22 feed the supply materials to a larry car 24 which is adapted to carry the materials to any one of a plurality of supply hoppers or transporters 26. The total capacity of the measuring hoppers 22 should be slightly less than the capacity of the larry car 24 or one of the transporters 26. As will be apparent, the larry car 24 is adapted to comprise a traveling hopper or to be transported by a crane to deliver the supply materials to any one of the plurality of transporters 26.

Each of the transporters 26 is associated with a conveying system according to the present invention, which may include a single hopper or transporter 26 for each system, or a single hopper or transporter for a plurality of systems. Preferably, however, a plurality of hoppers 26 are provided for each system. A feed conduit 28, in the nature of a rigid pipe or the like, is associated with the outlet of each of the hoppers 26 and is adapted for conveying materials throughout the system. A flop valve unit, indicated generally at 29, is associated with each of the transporters 26 to control the introduction of material thereto. Air for transporting materials through the conduits 28 may be introduced, as schematically indicated by a pipe 31, to introduce air at a plurality of jets into the hoppers 26 to force materials from the hoppers into the conduits 28 and to convey the materials through the conduits 28. Preferably, as shown, the feed conduit 28 is associated at each end thereof with a transporter 26 so that materials may be fed through the conduit 28 from either end thereof, whereby a continuous source of supply materials for the conveying system is insured.

Included within each conduit line 28 are a plurality of valve units 30, of the baffle box type, each adapted to govern the feed of material to a station defined by the valve. For example, a plurality of molding stations may be included in each feeding system. As shown, each molding station comprises a mold table or molding machine 32, a hopper 34 for feeding materials to the molding station 32, a conduit 36 leading to the hopper 34, a hopper station 32, a conduit 36 leading to the hopper 34, a hopper 38 leading into the conduit 36, an air separator and dust or dirt collector 40 associated with the hopper 38 and a flexible boot 42 or the like by means of which the valve units 30 are associated with the delivery station.

Each of the valve units 30 generally includes a removable pipe or conduit section 44 adapted to form a part of the conduit line 28 and a baffle box 46 adapted to be substituted in the conduit 28 for the removable conduit section 44, to divert materials from the conduit 28 to the station with which the valve is associated. Each baffle box 46 has mounted therein a plurality of flexible baffles 48, by means of which the material is diverted from the conduit or feed line 28 to the station defined by the valve unit. Each valve unit is provided with a motor unit or air cylinder, or the like, 50 to effect substitution of the baffle box 46 for the removable conduit section 44 and vice versa. In the preferred embodiment, each valve unit 30 preferably includes a second motor unit or air cylinder 52 adapted to effect actuation of a seal 54 to selectively seal the removable conduit section 44 and the baffle box 46 in the feed conduit 28.

In use and operation of the system, supply materials are conducted to the supply hoppers 20 and from there are gravity fed into the measuring hoppers 22 which, by gravity, feed materials into the larry car 24. The car 24 is then moved to any one of the plurality of transporters 26 to fill the transporter, which is then blown to convey material through the system. When it is desired to convey the materials throughout the system, suitable means are actuated to effect air feed to the filled transporter 26 to force the material therein through the conduit 28. Normally, however, air flow through the conduit 28 is not effected until such time as material feed to one delivery station is required. When it is desired to feed material to one of the delivery stations, suitable means are actuated, either manually or automatically, to effect actuation of the air cylinder or motor 52 to unseal the removable pipe section or conduit 44 of the particular valve unit so that same may be readily removed from the conduit 28. After the seal 54 has been broken, the air cylinder or motor 50 may be suitably actuated, either manually or automatically, to move the valve unit 30 upwardly to remove the pipe section 44 from the conduit 28 and to move the baffle box 46 into the conduit 28. When the baffle box 46 has been moved into the conduit, the motor or air cylinder 52 may be actuated, either manually or automatically, to seal the baffle box in the feed conduit. Thereafter, the air feed means is actuated to blow the transporter to supply and convey material through the conduit 28. For example, as shown in Figure 1, it may be considered that the transporter 26, at the left side of the complete conveying system shown, is filled with material and that air is being supplied thereto to convey materials through the conduit 28, through the removable pipe section 44 of the valve unit, to the left in the figure, and into the baffle box 46 of the valve unit 30, shown to the right, as is indicated by the arrows.

As the material, conveyed by compressed air, enters the baffle box 46, the flexible baffles 48 absorb the shock of the entering material and divert the flow of material from the conduit 28 into the hopper 38 connected to the baffle box by the flexible boot 42. As is shown in Figure 1, the baffles 48 in the baffle box 46 preferably depend loosely into the baffle box so that as the material enters the baffle box, the baffles are moved to the opposed side of the baffle box to seal the opposite side thereof, whereby materials are efficiently diverted from the conduit 28 into the hopper 38 and ultimately to the delivery station hopper 34.

When the transporter and associated line have been emptied, the supply of air to the particular hopper 26 is discontinued and the motor unit 52 is actuated to break the seal between the conduit 28 and the baffle box 46. Thereafter, the motor or cylinder 50 may be either manually or automatically actuated to move the baffle box 46 out of the conduit 28 and to move the removable pipe section 44 back into alignment with the conduit 28, at which time, the air cylinder 52 may be either manually or automatically actuated to seal the removable section 44 into the conduit 28.

As will be apparent from the foregoing, the present invention provides a pneumatic conveying system, for materials of the character referred to hereinbefore, including valve means adapted to control the flow of material through the system. It will also be appreciated that the conveying system is such that a plurality of delivery stations may be readily, efficiently and conveniently serviced or supplied with materials from a central source of supply.

Figure 2:
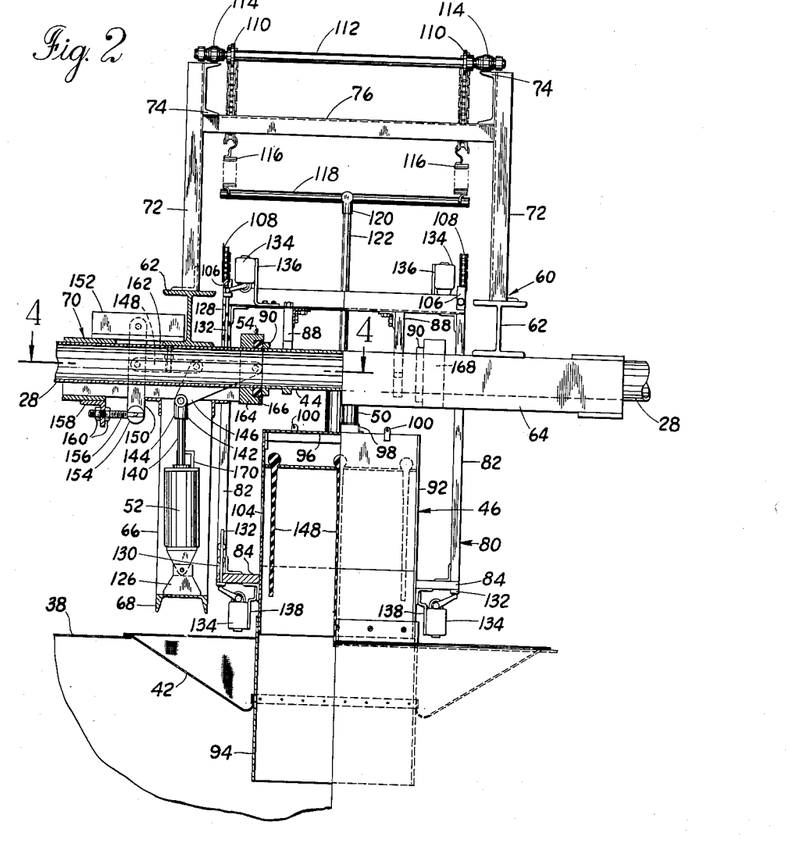
Figure 2 is a front view, partly in section and partly in elevation, of a preferred embodiment of the baffle box type of valve means of the present invention.
Figure 3:
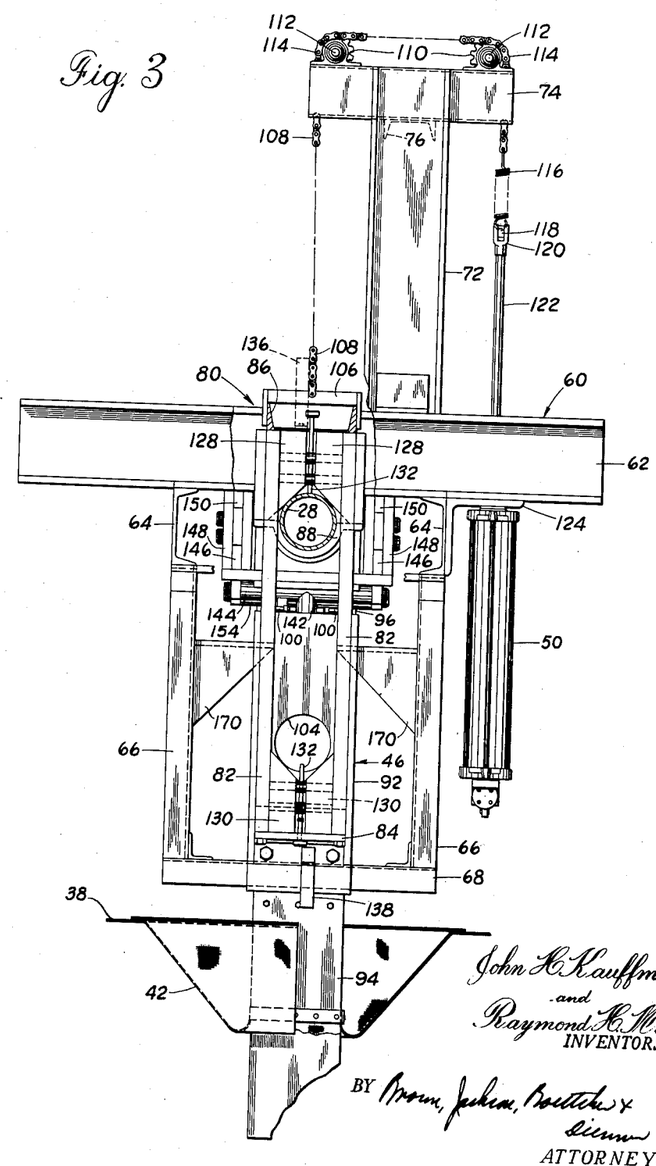
Figure 3 is a side view of the apparatus shown in Figure 2, with portions of the supporting frame broken away.
Figure 4:
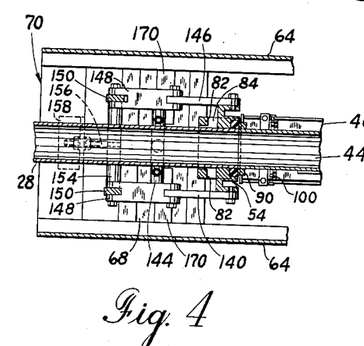
Figure 4 is a horizontal cross section taken substantially on the line 4—4 of Figure 2.
Figure 5:
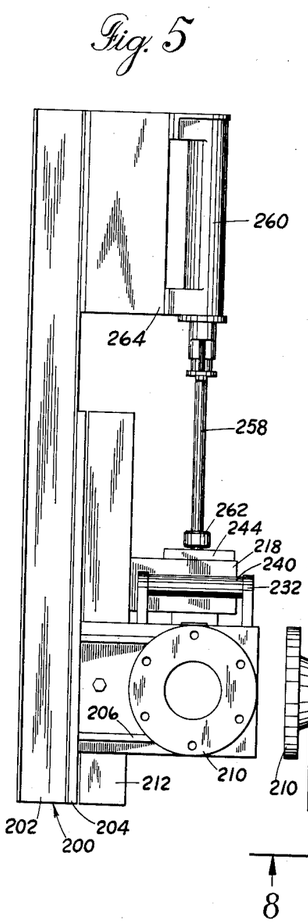
Figure 5 is a side elevation of a second embodiment of the valve means of the present invention adapted for use either as a baffle box type valve means or as valve means for controlling flow from one system to another, the view showing only a removable pipe or conduit section in association with actuating means.
Figure 6:
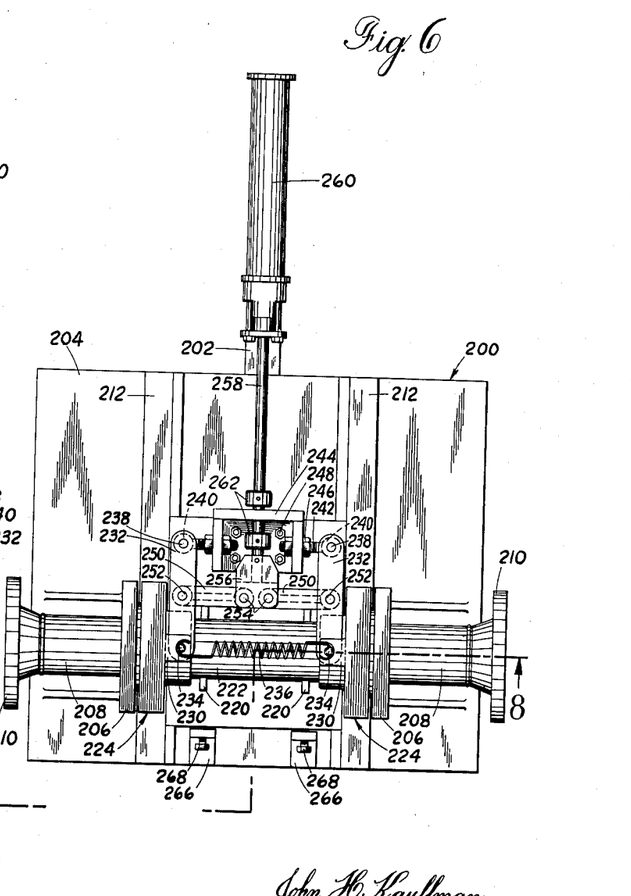
Figure 6 is a front elevation of the apparatus shown in Figure 5, showing the removable pipe disposed in the supply conduit.
Figure 7:
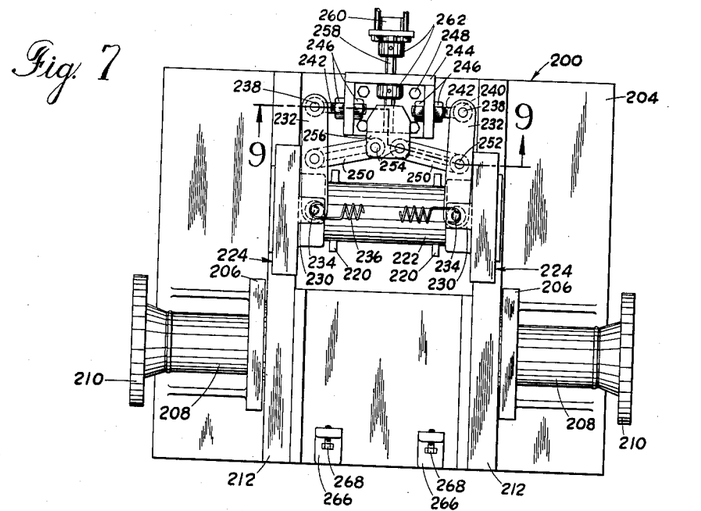
Figure 7 is a view similar to Figure 6, showing the removable pipe or conduit section disposed outside of the supply conduit.

With regard to the details of construction of a preferred embodiment of the baffle box type of valve means of the present invention, reference is made to Figures 2 to 4. Each valve unit 30 preferably includes a stationary frame 60 comprising spaced horizonal I-beams 62, spaced transverse horizontal channels 64, spaced depending vertical channels 66, a crosstie channel 68 joining the vertical channels 66 and braced by suitable angles, and a stationary assembly, indicated generally at 70. Extending upwardly from the spaced horizontal I-beams 62 are a pair of spaced vertical channels 72, each carrying at its upper end a horizontal channel 74, which are joined together by a horizontal channel tie member 76.

Mounted for reciprocal movement in the stationary frame 60 is a movable frame 80 comprising four vertical legs 82 defining the corners of a generally rectangular frame. The vertical legs 82 are joined together at their bottom ends by means of horizontally extending members 84 and the baffle box 46, and at their upper ends by means of a channel 86. Each pair of vertical legs 82 straddles a portion of the stationary pipe or conduit 28 and constitute therewith a guide means for vertical reciprocation of the movable frame 80. The removable pipe section 44 is secured to the frame 80 by means of a pair of generally U-shaped brackets 88 secured to and depending from the channel 86. At each end, the removable pipe or conduit section 44 is provided with a collar 90 adapted for cooperation with the stationary pipe 28, as will be described in greater detail hereinafter.

The baffle box 46 is supported substantially at its midpoint at the lower end of the movable frame 80 by means of the channel members 84 and suitable angle members. The baffle box 46 comprises an upper rectangular chamber or box portion 92, a lower rectangular chamber or box portion 94 secured to the box portion 92, and a removable cover 96 for the box portion 92. The cover 96 is provided with a handle 98 and a plurality of bolt locks 100 adapted to detachably secure the cover to the baffle box portion 92. Adjacent the upper end thereof, the baffle box portion 92 is provided with means for supporting the baffles in a loosely hanging manner. Such means may take any desired form, but preferably comprise a transverse plate or partition 102 having a plurality of slots therein adapted for the reception of the flexible baffles 48. As an alternative, spaced parallel rods may be provided to support the baffles. As pointed out hereinbefore, the baffles 48 are preferably formed of a resilient material, such as rubber, and depend in a loose or loosely hanging manner from the hanging means or partition 102 so as to be movable and flexible within the baffle box 46, whereby they are adapted to yield and flex to absorb the force of the incoming particles of material without undue wear. The baffles are preferably three in number, with the central baffle being considerably longer than the two side baffles. Accordingly, as materials enter through one side of the baffle box, through suitable apertures 104 provided in opposite walls of the box portion 92, the three baffles are swung or moved in the direction of material flow so that the baffle opposite the inlet aperture is forced against the aperture opposite the inlet aperture to seal the same and prevent exit of material from the baffle box, except through the open bottom end thereof. The baffle adjacent the inlet aperture and the elongate central baffle divert the material entering through the inlet aperture so that same gravitates downwardly through the the open bottom end of the baffle box portion 94. The other side baffle and portions of the central baffle line the wall of the box to prevent abrasive action thereon.

As is clearly shown in Figure 2, the baffles 48 are preferably integral members provided with enlarged head portions adapted to engage the upper surface of the hanging means or horizontal partition 102 in the baffle box 46, so that the baffles depend in a loosely hanging manner from the partition 102. Due to the particular manner of mounting the baffles, and to the provision of a removable cover for the baffle box 46, the baffles may be readily removed and replaced whenever necessary.

The baffle box portion 94 extends downwardly and normally extends into the hopper 38, to which it is flexibly connected by means of the boot 42, preferably comprising an annular piece of canvas secured to the peripheral wall of the baffle box portion 94 and to the upper wall or surface of the hopper 38. The boot 42 is preferably detachably secured to the baffle box portion 94 and to the hopper 38 so as to be readily replaceable.

The baffle box 46 and the boot 42 are shown more clearly, and claimed specifically, in our copending application, Serial No. 381,894, filed September 23, 1953, a division of the present application.

To effect actuation of the valve means of the present invention, the movable frame is moved with respect to the stationary frame so as to move the removable pipe section and the baffle box into and out of registry with the two spaced portions or sections of stationary pipe or conduit 28. Accordingly, the movable frame 80 is operatively associated with the motor or air cylinder 50 for actuation thereby. Preferably, a pair of plates 106 are secured to the upper outside edges of the upper channel member 86 of the movable frame 80, and a pair of chains 108 are secured to the plates 106. The chains 108 each extend upwardly and are trained over a pair of gears 110 mounted on cross shafts 112, which are journaled in bearings 114 mounted on the channel members 74. The opposite ends of the chains 108 are connected by means of springs 116 to opposite ends of a cross shaft or rod 118, which is connected at its midpoint, by means of a clevis 120, to the piston rod 122 of the motor 50. The cylinder of the air motor 50 is secured to and mounted on the stationary frame 60 by means of an angle 124 suitably secured to the I-beam 62 and to one of the channels 64. The air motor or cylinder 50 suitably may be provided with valve connections from a source of compressed air or, if desired, from a source of hydraulic fluid under pressure, and is adapted for manual or automatic actuation in response to the requirements at the delivery stations 32.

The motor or air cylinder 52 is also supported by the stationary frame 60 and is preferably pivotally mounted on a bracket 126 secured to the crosstie member 68 of the stationary frame. The motor 52 is adapted for actuation of the seal 54 in a manner to be described, and is actuated to open position prior to actuation of the cylinder 50 so that the seal between the stationary conduit 28 and the removable conduit 44 or the baffle box 46 is broken prior to movement of the movable frame 80. To control the extent of movement of the movable frame 80 and to provide for positive alignment of the removable pipe section 44 or the apertures 104 of the baffle box 46 with the stationary pipe sections 28, the movable frame 80 is provided with alignment blocks or sections 128 adjacent the removable pipe section 44 defining an inverted V and adapted for cooperative engagement with the stationary pipe sections 28, to limit downward movement of the movable frame and to define the point at which alignment of the pipe section 44 with the pipe sections 28 occurs. Adjacent its lower end, the movable frame 80 is provided with similar alignment blocks or sections 130 adjacent the apertures 104 in the baffle box 46 defining a V adapted to engage the stationary pipe sections 28 to limit upward movement of the movable frame and to provide for accurate alignment of the apertures 104 with the stationary pipe sections 28.

The sealing member 54 is preferably automatically actuated after each movement of the movable frame to close the seal on the valve means of the present invention. Accordingly, each of the alignment blocks 128 and 130 define a bore normal to the axis of the stationary pipe sections 28 adapted for the reception of a plunger 132. Four plungers 132 are provided and are each associated with a switch or valve, or similar controlling means, 134 adapted to effect control of the motor or air cylinder 52 to effect actuation of the seal 54 when the limit of movement of the movable frame has been reached. To provide for accurate alignment of the baffle box and removable pipe section with the stationary pipe sections, two switches or control means are provided at the upper end of the frame and two switches or control means are provided at the lower end of the frame so that, should there be any tilting or the like of the movable frame 80 during movement thereof, the motor 52 will not be actuated until perfect alignment is attained. In other words, each set of switches or control means, namely, the upper set and the lower set, are connected in series with the control means for the motor or air cylinder 52 so that the same cannot be actuated after or during movement of the movable frame until both plungers have been moved out of their normal positions to effect actuation of the switch means or control means with which they are associated.

The upper switch or valve means 134 are each secured to an angle bracket 136 secured to the base of the channel 86. The control means at the bottom of the movable frame are each secured to an angle bracket 138 secured to the angles supporting the baffle box 46.

The seal 54 is operatively associated with the motor 52 in the following manner. The piston rod 140 of the motor 52 is connected to a central socket 142 provided in a transverse shaft 144, which is pivotally connected at its ends to a pair of toggle arms 146. The toggle arms 146 are in the nature of bell crank levers or the like and are pivotally connected at their opposite ends to opposite sides of the seal 54. Intermediate their ends, each of the toggle arms 146 is pivotally connected to a generally horizontally extending link 148. The links 148 are each pivotally connected at their opposite ends to a generally vertically extending link 150. Each of the generally vertically extending links 150 is connected at approximately its midpoint to one of the links 148. The links 150 are each pivotally connected at their upper ends to a pair of angle members 152 forming a part of the stationary assembly 70. At their lower ends, the links 150 are each pivotally connected to the opposite ends of a transverse shaft 154. At its midpoint, the shaft 154 is adapted for the reception of a threaded stem 156 which extends rearwardly of the stationary assembly 70 and is received within a bore or aperture in one leg of an angle member 158. The threaded stem or stud 156 is adapted for the threaded reception of a pair of nuts 160 engaging opposite sides of the one leg of the angle member 158 to provide for adjustment of the linkage between the motor 52 and the seal 54. At least one of the links 148 carries a stud and lock nut 162 adapted to abut against the I-beam 62 to limit upward movement of the toggle linkage extending between the motor and the seal. The operation of the toggle linkage and the adjustment thereof will be obvious to those skilled in the art.

Figure 12:
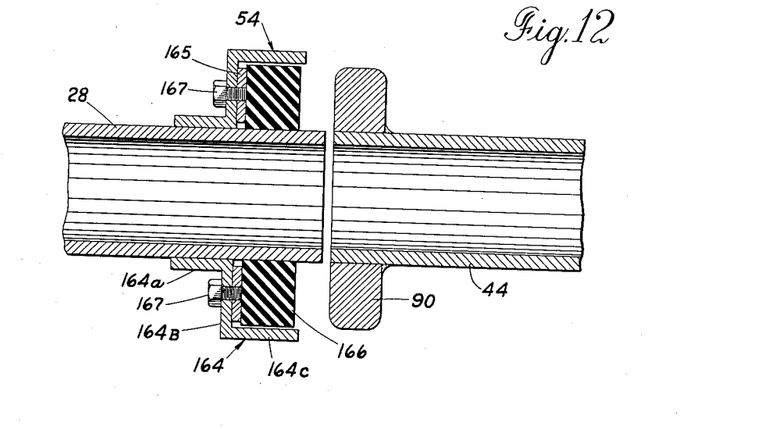
Figure 12 is a longitudinal cross sectional view of the improved sealing means of the present invention, showing the seal in open position.
Figure 13:
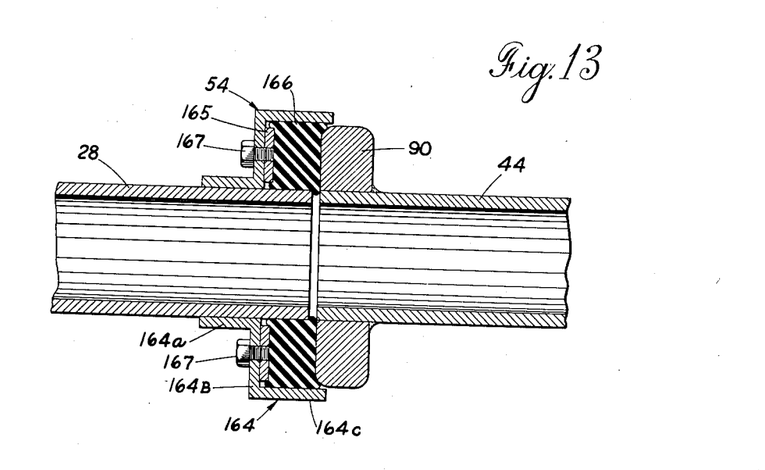
Figure 13 is a view similar to Figure 12 showing the seal in closed position.

The seal 54 is shown in detail in Figures 12 and 13 and preferably comprises an annular member 164 slidably mounted on one stationary pipe section 28 and having a recess therein adapted for the reception of an annular sealing member 166. The sealing unit also includes the pipe 44 and the collar or flange 90 welded to the same at the end thereof. The member 164 comprises a first cylindrical or sleeve portion 164a, a flange 164b extending radially outward of the sleeve 164a and a second cylindrical portion 164c having an inner diameter greater than the external diameter of the collar 90 on the conduit section 44. The cylindrical portion 164c defines the annular recess within which the seal 166 is received. The seal 166 comprises a thick, annular rubber gasket suitably secured, as by vulcanization, to a metallic base ring 165. The ring 165 is provided with a plurality of tapped bores adapted for the reception of bolts 167 extending through the flange portion 164b of the member 164. As will be apparent, the bolts 167 firmly, but detachably retain the seal 166 within the cylindrical portion 164c.

As is shown, the seal 166 engages the stationary pipe section 28 fairly intimately, but is adapted to be moved along the pipe upon actuation of the toggle linkage. As the sealing member is moved along the pipe 28 toward the pipe 44, the collar 90 is received within the cylindrical portion 164c and the seal 166 engages the collar. When the seal 166 is moved into firm engagement with the collar 90, as is shown in Figure 13, the rubber material of the seal flows around and over the collar 90 and the base ring 165, into initimate sealing engagement with the pipe 28 and the cylindrical portion 164c and into the space between the two pipe sections to provide a perfect seal therebetween. Since the seal 166 is only brought into sealing engagement with the pipe section 28 when the members are disposed as shown in Figure 13, the present invention obviates the need for packing glands and the like and provides an economical and highly efficient seal. This seal is claimed specifically in our copending application, Serial No. 381,944, filed September 23, 1953, a division of the present application.

In use, the seal 54 is adapted to engage one end or side of either the removable pipe section 44 or the baffle box 46, to seal the particular member to the one portion of the stationary pipe section 28 upon which the sealing collar or block 164 is slidably mounted. With respect to the baffle box, it is to be pointed out that the seal need not be highly efficient, but that the important factor is to clamp the baffle box between the stationary pipe sections to prevent distortion of the box and the carriage. If this feature were not provided, the baffle box carriage would have to be of extremely heavy section. At its opposite end, the pipe section 44 or the baffle box 46 is adapted to be sealed to the other portion of the stationary pipe or conduit 28 by means of a stationary seal 168, which is generally similar to the seal 54. If desired, the seal 168 may be movably mounted for actuation by means similar to those for actuating the seal 54. To limit downward movement of the toggle linkage extending between the motor 52 and the seal 54, each depending vertical leg 66 of the stationary frame carries a generally triangular shaped stop member 170 adapted to extend into the path of movement of the piston rod 140 and associated apparatus of the toggle linkage.

In operation and use, assume the apparatus to be in the position shown in Figures 2 and 3, and the device to be actuated to move the baffle box into the conduit 28 to effect diversion of material to the delivery station with which the particular valve means is associated. To effect actuation of the valve means, suitable and customary control means may be actuated, either automatically in response to control means associated with the delivery station or manually in response to actuation by the operator at the particular delivery station. Actuation of the said customary means will first effect a supply of compressed air to the motor 52 to move the piston rod 140 inwardly of the air cylinder, to move the seal 54 along the stationary pipe section 28 and away from the removable pipe section 44, by means of the toggle linkage mechanism, to break the seal between the stationary pipe section 28 and the removable pipe section 44. When the toggle linkage engages the stop members 170, suitable means of conventional design may be actuated to effect actuation of the air cylinder 50 by the supply of compressed air to the cylinder to move the piston rod 122 of the cylinder downwardly. Downward movement of the piston rod 122 is transmitted to the movable frame 80 by means of the springs 116 and the chains 108 to effect upward movement of the movable frame 80. Movement of the frame 80, with respect to the stationary pipe sections 28 and with respect to the stationary frame 60, is guided by means of the pairs of legs 82 engaging the stationary pipe sections 28. As the movable frame 80 approaches the upper limit of its movement, the stationary pipe sections 28 to opposite sides of the baffle box are engaged by the alignment blocks 130, and as the alignment blocks 130 are moved into intimate engagement with the pipe sections 28, the plungers 132 associated with the alignment blocks 130 are moved downwardly, against a normal spring load or the like, to effect actuation of the switch, valve or control means 134 with which the plungers are associated. When both of the lower plungers 134 have been actuated by the respective portions of the stationary conduit 28, the motor 52 is automatically actuated by the supply of air to the opposite side of the piston thereof to effect upward movement of the piston rod 140 to effect, through the toggle linkage, movement of the seal 54 into engagement with the side wall of the baffle box portion 92. Movement of the seal 54 into engagement with the portions of the baffle box surrounding the aperture 104 in the one wall thereof, effects slight lateral movement of the baffle box to force same into intimate abutting engagement with the seal 168 provided on the other stationary pipe section 28. Accordingly, the baffle box 46 will be sealed within and braced by the conduit 28, with the apertures 104 in the walls of the baffle box aligned with the stationary pipe sections. Thereafter, the pneumatic material conveying apparatus may be either manually or automatically actuated to cause the flow of material to the baffle box from either side thereof. As material enters one of the apertures 104 in the baffle box, the baffles will yieldably flex and move so that the inlet aperture 104 is fully opened and the aperture at the opposite side of the baffle box is yieldably shut by means of the baffle adjacent thereto sealingly engaging the wall of the baffle box about the aperture 104. The short baffle 48 adjacent the inlet aperture and the elongate central baffle effectively divert all of the material introduced to the baffle box from the conduit 28 so that the material gravitates through the open lower end of the baffle box portion 94 and into the hopper 38, with which the baffle box is associated. The baffle 48 adjacent the opposite wall of the box protects that wall from the abrasive action of the entering material.

When the transporter 26 has been blown to supply material to the delivery station defined by the valve means of the present invention, the valve means may be returned to its normal position, namely, the position wherein the removable pipe section 44 is disposed in the stationary pipe 28, by discontinuing the conveying air supply and by effecting actuation of the air motor 52 to break the seal between the pipe section 28 and the baffle box 46. After the seal has been broken, the cylinder 50 is automatically or manually actuated to relieve or vent the same so that the movable frame 80 may readily gravitate to its lowermost position. As the movable frame 80 approaches its lowermost position, the alignment blocks 128 engage the upper surfaces of the stationary pipe sections 28, and continued movement of the frame 80 is accommodated until both of the plungers 132 associated with the blocks 128 are moved upwardly to effect actuation of the control means with which the same are associated. Actuation of both of the control means 134 preferably automatically effects actuation of the air cylinder 52 to effect actuation of the seal 54 to seal the removable pipe or conduit section 44 back into the stationary pipe sections 28.

From the foregoing, it will be appreciated that the present invention provides a highly efficient and practical valve means for pneumatic conveying systems wherein actuation of the valve means is positive and wherein the structure of the valve means is extremely economical and entirely practical. Due to the fact that accurate alignment of the removable pipe section and the baffle box with the stationary pipe sections 28 is effectively accomplished without the necessity for accurately machined or formed cooperating structures, the valve means of the present invention is insured of long and efficient service. Due to the flexible nature and movable mounting thereof, the baffles 48 of the valve means are capable of service over extended periods of time. However, particularly with the use of abrasive materials, it will be appreciated that the baffles may eventually wear out, in which case the baffles may be readily replaced by removal of the baffle box cover 96, removal of the worn-out baffles 48, and the insertion of new baffles in a ready and convenient manner.

Figure 8:
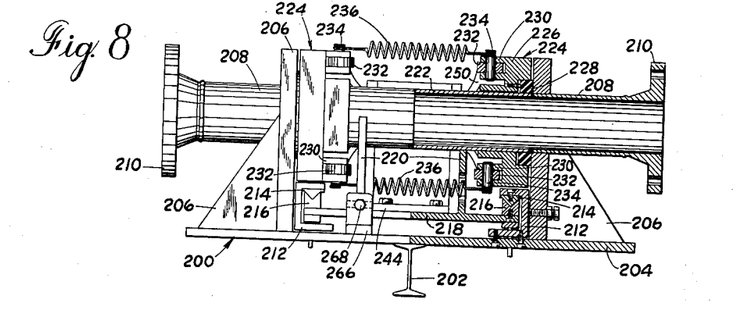
Figure 8 is a bottom view, partly in section and partly in elevation, taken substantially on the line 8—8 of Figure 6.
Figure 9:
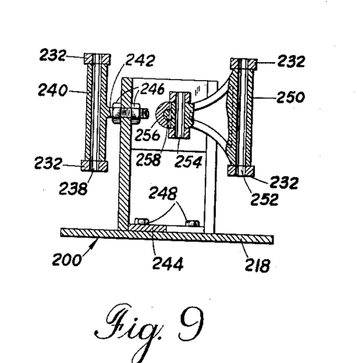
Figure 9 is a horizontal cross section taken substantially on the line 9—9 of Figure 7.

A second embodiment of our invention is disclosed in Figures 5 to 9, wherein we have shown only a removable pipe section and the apparatus associated therewith. The apparatus shown in Figures 5 to 9 is adapted for use either as a baffle box type of valve means or as a valve means for controlling flow from one system to another, as will appear more fully hereinafter. For example, the baffle box described hereinbefore may be combined with the shown apparatus in a manner obvious to those skilled in the art, or the shown apparatus may be modified to meet the requirements of the apparatus shown in Figures 10 and 11, as will be described hereinafter. The embodiment of the present invention shown in Figures 5 to 9 includes a stationary frame 200 comprising a vertical I-beam 202 and a plate 204 secured to the I-beam 202, and having suitably apertured bosses 206 adapted for the reception of a pair of stationary pipe sections 208. The bosses 206 preferably are formed integrally with the plate 204, but may be formed separately thereof and secured thereto in a conventional manner, if desired. The stationary pipe sections 208 are each provided with an outer flange or collar 210, by means of which the pipe section may be suitably connected to other stationary pipe and conduit sections, as are disclosed in Figure 1. The stationary plate 204 carries a pair of generally U-shaped guide members or channels 212 suitably secured to the plate 204. As shown in Figure 8, each of the guide members 212 has secured to the inner wall of one leg thereof, a generally V-shaped block or guide 214 adapted for the reception and guidance of a guide member 216. Each of the guide members 216 is provided with a V-groove adapted for the reception of the V-block 214, by means of which the members 216 are guided for vertical reciprocation. The guide members 216 support the opposite ends of a plate 218 and comprise therewith a movable frame. The plate 218 is provided with integral lateral or transverse extensions or legs 220 carrying a removable pipe section 222. The removable pipe or conduit section 222 carries a pair of opposed sealing members 224, each comprising an annular body 226 slidably mounted on the pipe 222 and an annular seal 228 fitting within a recess provided in the body 226. The sealing members 224 are each annular in form and are mounted on the peripheral surface of the removable pipe section 222 for movement axially thereof. It is preferred that the sealing members 224 be substantially the same as the sealing members 54 and meet the basic requirements of the sealing means shown in detail in Figures 12 and 13. In particular, the seals 228 preferably have the flowing action described hereinbefore so that the same seal on the pipe 222 without the necessity for packing glands.

The body member 226 of each of the seals 224 is provided with bifurcated portions 230 at diametrically opposite sides thereof adapted for the reception of a pair of links 232 pivotally secured to the body 226 by means of suitable pivot pins 234 or the like. The two sealing members 224 are biased toward one another by a pair of coil springs 236 engaging corresponding pivot pins 234 on each of the sealing member bodies 226. At their upper ends, each pair of links 232 are connected, suitably by means of a pivot pin 238, to a support member 240. The support members 240 are pivotally mounted on the pivot pins 238 and are each provided with an integral central stud 242 adapted to pass through a suitable hole or aperture provided in the opposite walls of a generally box-like member 244. The studs 242 of the two support members 240 are preferably secured to the box-like member 244 in adjusted position by means of suitable nuts 246. The box-like member 244 is suitably secured to the movable plate member 218 by means of bolts 248 or the like, so that the support members 240 comprise fixed pivotal mounts for the generally vertically extending links 232.

Intermediate their ends, the links 232 are each pivotally connected to a pair of toggle links 250 by means of a pivot pin 252. In plan view, the toggle links 250 are tapered links adapted at their smaller end for the reception of a pivot pin 254 by means of which, each link 250 is connected to an actuating head 256. The head 256 is suitably secured to and actuated by a piston rod 258 of a motor unit or pneumatic or hydraulic cylinder 260. The piston rod 258 extends through one wall of the box-like member 244 and is provided with a pair of stop members 262 disposed to opposite sides of said wall of said box-like member.

The motor cylinder 260 is supported by a bracket 264 suitably secured to the vertical I-beam 202. To limit downward movement of the movable plate 218, a pair of stops 266 are suitably secured adjacent the lower margin of the stationary plate 204, and each of the stops 266 is provided with a set screw 268 or the like, by means of which, the lower limit of movement of the movable pipe section is adjustably defined.

In operation and use, actuation of the cylinder 260 effects upward movement of the piston rod 258 to move the lowermost of the stop members 262 into engagement with the upper wall of the box-like member 244. During movement of the piston rod 258 to the position defined, the actuating head 256 is moved upwardly with the piston rod to effect actuation of the toggle links 250 to release the sealing members 224, so that same may be moved inwardly toward one another by means of the coil springs 236. Accordingly, a lost-motion connection is provided between the motor and the movable frame so that when the lowermost of the two stop members 262 engages the upper wall of the box-like member 244, the toggle linkage is actuated to break the seal between the removable pipe section 222 and the stationary pipe sections 208. Continued upward movement of the piston rod 258, through engagement of the stop 262 with the box-like member 244, effect upward movement of the movable frame and the apparatus thereby, namely, the removable pipe section, the sealing members and the toggle linkage. The movable frame is guided for reciprocal vertical movement by means of the cooperating guide members 212, 214 and 216.

When it is desired to return the removable pipe section 222 to the stationary conduit sections 208, the pneumatic motor 260 is actuated in the opposite direction to move the piston rod 258 downwardly. As the piston rod 258 moves downwardly, the upper wall of the box-like member 244 rests upon the top surface of the lowermost of the stop members 262, so that the movable frame and apparatus carried thereby gravitates to its lowermost position as determined by the adjustable lowermost stop members 268, in which position the removable pipe stop section 222 is brought into alignment with the stationary pipe sections 208. Continued downward movement of the piston rod 258 then effects actuation of the toggle linkage to move the sealing members 224 into sealing engagement with the flanges or bosses 206 constituting the ends of the stationary pipe sections 208 and with the removable pipe section 222.

Suitable baffle box means may be readily carried by the movable plate section 218 and may include separate sealing means adapted to be suitably actuated by motion transmitting linkages extending between the piston rod 258 of the cylinder 260 or by means of a separate pneumatic cylinder or motor. Any baffle box to be associated with the apparatus disclosed in Figure 5 to 9, preferably includes its own sealing means adapted for actuation in much the same manner as the sealing means associated with the removable pipe section 222. As was pointed out hereinbefore, the baffle box should be closely confined between the stationary pipe sections 208 to prevent distortion of the baffle box and the movable carriage. However, if the baffle box is not to be accurately and positively sealed within the stationary conduit, it is advisable to provide the baffle box with a separate carriage of heavy section and flexibly connect the baffle box carriage to the carriage for the removable pipe section. As an alternative, the movable carriage shown and the guides therefor may be made of heavy section to prevent distortion of the same.

From the foregoing, it will be appreciated that the present invention provides improved valve means of economical construction and of practical operation for pneumatic conveying systems, wherein the valve means includes a removable pipe section and a baffle box adapted to be selectively inserted in the main supply conduit of a pneumatic conveying system.

Figure 10:
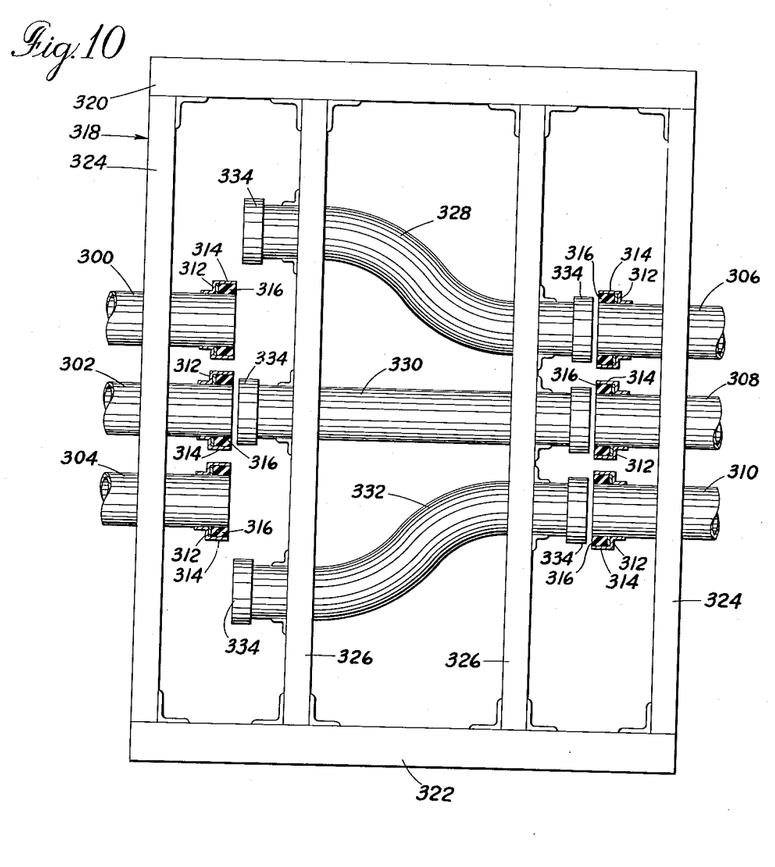
Figure 10 is a side elevation of the type of valve means of the present invention for controlling flow from a number of primary systems to a number of secondary systems.
Figure 11:
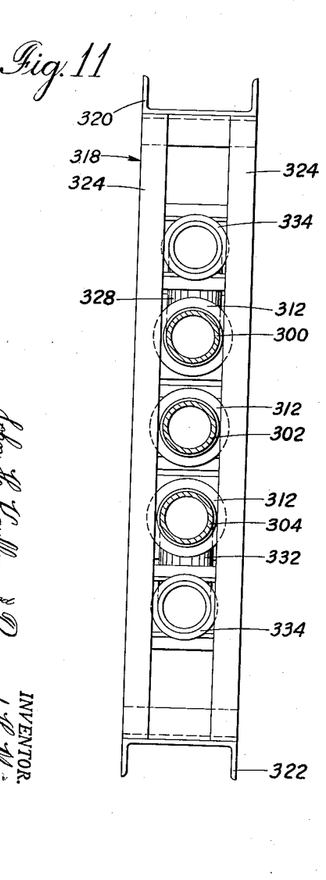
Figure 11 is an end view of the apparatus shown in Figure 10.

In a further embodiment of the present invention, shown in Figures 10 and 11, the valve means of the invention has been adapted to a use other than that provided by the baffle box type units. In this use, the valve means comprises a plurality of conduits adapted selectively to establish communication between any one of a plurality of secondary system conduits. The adaptation of such valving means to systems such as that shown in Figure 1 will become obvious as the description proceeds. Referring to Figures 10 and 11, we have shown a first set of spaced parallel stationary conduits 300, 302 and 304, which for purposes of convenience of description, may be regarded as conduits leading from each of several primary systems. A second set of spaced parallel stationary conduits 306, 308 and 310 is disposed in alignment with but spaced from the first set of stationary conduits. The second set of spaced parallel of stationary conduits 306, 308 and 310 are referred to hereinafter, conduits 306, 308 and 310 are referred to hereinafter, for purposes of convenience of description, as each comprising a portion of several secondary conveying systems. The two sets of stationary conduits are, as stated, spaced apart, but are so disposed with respect to one another that the respective conduits of each set are aligned with one another. In other words, the stationary conduits 300, 302 and 304 are axially aligned with the stationary conduits 306, 308 and 310, respectively. The conduits 300 to 310 may be stationarily supported in any suitable manner, not shown. At the free end thereof, each of the stationary conduits carries a seal 312, which seals are each of the type shown in Figures 12 and 13. Each of the seals comprises an annular sleeve member 314 and a sealing member 316 received within the member 314. Each of the seals may be movably mounted on the respective pipe, as is shown in Figures 12 and 13, for individual movement on the respective conduit in much the same manner as the seal 54 described hereinbefore with respect to Figures 2 to 4. If desired, the seals 312 may each be actuated by means similar to those described in connection with the seal 54. As an alternative, the seals of the three primary system conduits may be interconnected for simultaneous actuation and the seals on the three secondary system conduits may likewise be interconnected for simultaneous movement. If desired, however, the seals on the conduits of one of the systems may be stationary so that the arrangement is similar to that disclosed in the Figures 2 to 4.

The valve means of the present embodiment of the invention includes a movable frame 318 comprising a top channel 320, a bottom channel 322, four corner posts 324, each pair of which straddle the conduits 300 to 310 so as to be guided by the conduits, and four mounting posts 326. The various members of the movable frame 318 are suitably secured together by means of angle members, as shown, and the connection is preferably accomplished by welding. To provide means for establishing communication between any one of the primary system conduits and any one of the secondary system conduits, the valve means of the present invention includes a plurality of valving conduits comprising an upper conduit 328 which is curved between the ends thereof so that the vertical spacing between the opposite ends of the conduit is equal to the vertical spacing between adjacent stationary conduits. The valve means also includes a central straight valving conduit 330 and a lower valving conduit 332 which is substantially identical to the valving conduit 328 but oppositely curved. Each of the valving conduits is provided at the opposite ends thereof with a collar or flange 334 adapted to cooperate with the sealing members 312 to sealingly couple the valving conduits between the primary and secondary system conduits. The valving conduits 328, 330 and 332 are fixed to the movable frame or carriage 318 by means of a pair of angle members adjacent each end of each conduit bridging the posts 326 of the movable frame.

The movable frame 318 and the valving conduits 328, 330 and 332 are movable with respect to the stationary conduits 300 to 310 and are guided for vertical reciprocation with respect to the stationary conduits by means of the posts 324 of the frame 318 straddling and being guided by the stationary conduits. The movable frame 318 is adapted to be moved with respect to the stationary conduits in any suitable manner, such for example as by actuating means similar to those described in reference to the movable frame of the embodiment of the invention shown in Figures 2 to 4. Upon vertical reciprocation of the frame 318, the valving conduits may be disposed between various ones of the primary conduits and the secondary conduits. For example, the straight valving conduit 330 is adapted to establish communication between the aligned conduits 300—306, 302—308 and 304—310. The upper curved conduit 328 is adapted to establish communication between the conduits 300 and 308 and between the conduits 302 and 310. The lower curved valving conduit 332 is adapted to establish communication between the primary conduit 302 and the secondary conduit 306 and between the conduits 304 and 308. Accordingly, it will be appreciated that the valve means of the present invention is adapted to establish communication between any one of the primary system conduits and any one of the secondary system conduits. As shown in Figures 10 and 11, however, the valve means is not adapted to establish communication between the conduit 300 and the conduit 310 or between the conduit 304 and the conduit 306. If it is desired to establish communication at various times between the combinations of conduits stated, the valve means of the present invention may suitably include additional valving conduits that have the opposite ends thereof spaced apart by a distance equal to the vertical spacing between two of the stationary conduits. While three stationary primary system conduits and three stationary secondary system conduits have been shown in Figures 10 and 11, it will be appreciated that the number of stationary conduits may be decreased or increased in various desired numbers. For example, the primary system conduit 302 could be the only one provided in which case the valve means as shown would be adapted to establish communication between the single primary system and any one of the secondary system conduits 306, 308 and 310. Likewise, the secondary system conduits 306 and 310 could be omitted so that material could be supplied to the secondary system conduit 308 from any one of the primary system conduits 300, 302 and 304. In instances wherein only one primary system conduit, or only one secondary system conduit is provided, blank pipes may be substituted for the omitted conduits to provide sealing faces for the valving conduits not in use.

From the foregoing, it will be appreciated that the present invention provides an improved valve means adapted to selectively establish communication between any one of a plurality of primary system conduits and any one of a plurality of secondary system conduits. In accordance with the present invention any of the primary and secondary system conduits may suitably include baffle box valve means as described hereinbefore in addition to the particular valve means shown in Figures 10 and 11. It will also be apparent from the foregoing that the valve means shown in Figures 5 to 9 is readily adapted for use between primary system conduits and secondary system conduits by slight modification in accordance with Figures 10 and 11.

While we have described what we regard to be preferred embodiments of our invention, it will be apparent that various changes, rearrangements and modifications may be made therein without departing from the spirit and scope of the invention, as defined by the appended claims.

We claim:

1. Valve means for pneumatic conveying systems comprising a stationary frame, a pair of spaced stationary pipe sections associated with said stationary frame, a movable frame supported by said stationary frame, said movable frame including a plurality of legs straddling said stationary pipe sections for guiding movement of said movable frame with respect to said stationary frame and said stationary pipe sections, a motor mounted on said stationary frame and operatively associated with said movable frame for effecting movement thereof, a pipe section mounted on said movable frame and adapted to be disposed between said stationary pipe sections to form therewith a continuous conduit, a baffle box mounted on said movable frame to one side of said pipe section and adapted to be disposed between said stationary pipe sections, said motor being adapted selectively to move said pipe section carried by said movable frame and said baffle box between said stationary pipe sections, sealing means for selectively sealing said pipe section carried by said movable frame and said baffle box to said stationary pipe sections, a second motor supported by said stationary frame and operatively associated with said sealing means for effecting actuation thereof, and control devices carried at opposite ends of said movable frame and adapted for cooperation with said stationary pipe sections, said control devices being four in number and being paired and adapted for actuation by said stationary pipe sections when said movable frame is moved to either one of two predetermined positions wherein said pipe section carried by said movable frame and said baffle box respectively are aligned with said stationary pipe sections, said control devices, as paired, being included in the control circuit for said second motor to accommodate actuation of said second motor in response to movement of said movable frame to either one of its two predetermined positions.

2. A conveying system for materials of the character described comprising a supply conduit including conduit sections disposed in spaced relation, a baffle box disposed between said conduit sections having a discharge outlet and openings on opposite sides thereof respectively aligned with said conduit sections, means operably connected with the upstream side of said supply conduit for effecting a flow of fluid to said baffle box to convey materials thereto, and baffle means of a flexible material disposed in said box for diverting a material flowing through said supply conduit to said discharge outlet of said baffle box, said baffle means being movable in response to said flow of fluid to close one of said openings on the downstream side of said baffle box.

3. A conveying system for materials of the character described comprising a supply conduit including conduit sections disposed in spaced relation, a baffle box disposed between said conduit sections having a discharge opening and openings on opposite sides thereof respectively aligned with said conduit sections, means connected with the upstream side of said supply conduit for effecting a flow of elastic fluid to said baffle box to convey materials thereto, baffle means of a flexible material disposed in said box for diverting a material flowing through said supply conduit to said discharge outlet of said baffle box, said baffle means being movable in response to said flow of fluid to close one of said openings on the downstream side of said baffle box, and an air separator operably connected to said baffle box.

4. A conveying system for materials of the character described comprising a supply conduit including first and second conduit sections disposed in spaced relation, a baffle box disposed between said conduit sections having a discharge outlet and openings on opposite sides thereof respectively aligned with said conduit sections, first means operably connected with said first section of said supply conduit for affecting a flow of fluid through said first conduit section to said baffle box to convey materials thereto, second means operably connected with said second section of said supply conduit for alternatively effecting a flow of fluid through said second conduit section to said baffle box to convey materials thereto, and baffle means of a flexible material disposed in said box for diverting a material flowing in either direction through said supply conduit to said discharge outlet of said box, said baffle means being movable in response to a flow of fluid in either direction through said supply conduit to close one of said openings on the downstream side of said box.

5. A conveying system for materials of the character described comprising a supply conduit including conduit sections disposed in spaced relation, a pipe section adapted to be disposed between said conduit sections, a baffle box adapted to be disposed between said conduit sections having a discharge outlet and openings on opposite sides thereof respectively aligned with said conduit sections, means connected with the upstream side of said supply conduit for effecting a flow of fluid to said space between said conduit sections to convey materials thereto, means for selectively moving said pipe section and said baffle box into and out of the space between said conduit sections to respectively accommodate a through flow of material through said conduit and to divert material from said supply conduit to said discharge outlet of said baffle box, and baffle means of a flexible material disposed in said box, said baffle means being movable in response to said flow of fluid to close one of said openings on the downstream side of said baffle box.

6. A conveying system for materials of the character described comprising a supply conduit including conduit sections disposed in spaced relation, a pipe section adapted to be disposed between said conduit sections, a baffle box adapted to be disposed between said conduit sections having a discharge outlet and openings on opposite sides thereof respectively aligned with said conduit sections, means connected with the upstream side of said supply conduit for effecting a flow of fluid to said space between said conduit sections to convey materials thereto, means for selectively moving said pipe sections and said baffle box into and out of the space between said conduit sections to respectively accommodate a through flow of material through said conduit and to divert material from said supply conduit to said discharge outlet of said baffle box, means for selectively sealing said pipe section and said baffle box in said supply conduit, and baffle means of a flexible material disposed in said box, and baffle means being movable in response to said flow of fluid to close one of said openings on the downstream side of said baffle box.

References Cited in the file of this patent

UNITED STATES PATENTS

| | | |
|---|---|---|
| 412,388 | Hungerford | Oct. 8, 1889 |
| 1,538,027 | Cushing | May 19, 1925 |
| 1,857,643 | Kinyon | May 10, 1932 |
| 2,140,128 | Craggs | Dec. 13, 1938 |
| 2,153,984 | Leicht | Apr. 11, 1939 |
| 2,195,407 | Craggs | Apr. 2, 1940 |
| 2,219,289 | Bennett | Oct. 29, 1940 |
| 2,380,310 | Hornbrook | July 10, 1945 |
| 2,380,311 | Hornbrook | July 10, 1945 |
| 2,639,196 | Glaza | May 19, 1953 |